US012782200B2

(12) United States Patent
Sung et al.

(10) Patent No.: US 12,782,200 B2
(45) Date of Patent: Nov. 3, 2026

(54) TESTING INSTRUMENT AND TEMPERATURE CONTROL ASSEMBLY THEREOF

(71) Applicant: Wistron Corporation, New Taipei City (TW)

(72) Inventors: Chen-An Sung, New Taipei City (TW); Chiung-Wei Chen, New Taipei City (TW); Cheng-Hsing Liu, New Taipei City (TW)

(73) Assignee: WISTRON CORPORATION, New Taipei City (TW)

(*) Notice: Subject to any disclaimer, the term of this patent is extended or adjusted under 35 U.S.C. 154(b) by 1010 days.

(21) Appl. No.: 18/059,501

(22) Filed: Nov. 29, 2022

(65) Prior Publication Data

US 2024/0064867 A1 Feb. 22, 2024

(30) Foreign Application Priority Data

Aug. 19, 2022 (TW) .................................. 111131407

(51) Int. Cl.
*B01L 9/02* (2006.01)
*B01L 7/00* (2006.01)
(Continued)

(52) U.S. Cl.
CPC ................ *G01K 1/026* (2013.01); *B01L 7/52* (2013.01); *B01L 9/02* (2013.01); *G01N 35/025* (2013.01); *G05D 23/1934* (2013.01)

(58) Field of Classification Search
CPC ............ G01K 13/08; G01K 1/14; G01K 1/16; G01K 1/026; G01N 35/00; G01N 35/025; G01N 2035/00376; G01N 35/1079; G05D 23/1917; G05D 23/1934; B01L 9/06; B01L 7/52; B01L 2200/147; B01L 2300/1805; B01L 2300/0803
See application file for complete search history.

(56) References Cited

U.S. PATENT DOCUMENTS 5,475,610 A 12/1995 Atwood
5,795,547 A 8/1998 Moser et al.
(Continued)

FOREIGN PATENT DOCUMENTS

CN 105733939 A 7/2016
CN 214781858 U 11/2021
(Continued)

OTHER PUBLICATIONS

Computer translation of WO_2018150648_A1 (Year: 2026).*
(Continued)

*Primary Examiner* — Randy W Gibson
(74) *Attorney, Agent, or Firm* — McClure, Qualey & Rodack, LLP

(57) ABSTRACT

A temperature control assembly includes a plurality of heating units and a plurality of temperature sensors. The heating units are arranged in a ring shape, and the temperature sensors are respectively arranged on the heating units. Each of the heating units includes a bearing hole and a heating body. The heating body surrounds the bearing hole and is configured to generate heat, and each of the temperature sensors is configured to sense a temperature.

19 Claims, 12 Drawing Sheets

(51) Int. Cl.

| | |
|---|---|
| ***G01K 1/02*** | (2021.01) |
| ***G01N 35/02*** | (2006.01) |
| *G05D 23/19* | (2006.01) |

(56) References Cited

U.S. PATENT DOCUMENTS

| | | | | |
|---|---|---|---|---|
| 5,863,506 | A * | 1/1999 | Farren | G01N 21/0332 422/547 |
| 10,815,524 | B2 * | 10/2020 | Nammoku | B01L 7/52 |
| 12,359,979 | B2 * | 7/2025 | Wu | G01K 1/16 |
| 2015/0367348 | A1 * | 12/2015 | Sano | B01L 7/5255 435/286.1 |
| 2017/0227558 | A1 * | 8/2017 | Nammoku | B01L 7/52 |
| 2018/0240652 | A1 * | 8/2018 | Ma | H01J 37/32522 |

FOREIGN PATENT DOCUMENTS

| | | | | |
|---|---|---|---|---|
| EP | 2949741 | A1 * | 12/2015 | B01L 7/5255 |
| JP | 2012228212 | A * | 11/2012 | |
| TW | 201836442 | A | 10/2018 | |
| WO | 2013/133725 | A1 | 9/2013 | |
| WO | 2016/013607 | A1 | 1/2016 | |
| WO | WO-2018150648 | A1 * | 8/2018 | H10N 10/13 |
| WO | 2018/188655 | A1 | 10/2018 | |

OTHER PUBLICATIONS

Computer translation of JP_2012228212_A (Year: 2026).*

Examination report dated Jun. 16, 2026, listed in related China patent application No. 202211100420.8.

Examination report dated Apr. 21, 2026, listed in related India patent application No. 202314001954.

Michael S. Bartsch et al., "The Rotary Zone Thermal Cycler: A Low-Power System Enabling Automated Rapid PCR", PLOS ONE, Mar. 31, 2015, https://pmc.ncbi.nlm.nih.gov/articles/PMC4380418/pdf/pone.0118182.pdf. Whole document particularly abstract; Materials and Methods.

* cited by examiner

TESTING INSTRUMENT AND TEMPERATURE CONTROL ASSEMBLY THEREOF

CROSS-REFERENCE TO RELATED APPLICATION

This non-provisional application claims priority under 35 U.S.C. § 119(a) to Patent Application No. 111131407 filed in Taiwan, R.O.C. on Aug. 19, 2022, the entire contents of which are hereby incorporated by reference.

BACKGROUND

Technical Field

The present invention relates to a heater, and in particular, to a testing instrument and a temperature control assembly.

Related Art

Products (for example, genetic testing instruments) on the market that use polymerase chain reaction (PCR) or quantitative polymerase chain reaction (QPCR) principles require rapid heating and cooling. An existing testing instrument can simultaneously detect samples in a plurality of test tubes. During the test, the testing instrument rotates to detect a fluorescent reagent in each test tube through an optical sensor, and controls a temperature through a heater and a fan, thereby activating a reaction of the reagent in the test tube. However, the existing testing instrument simultaneously heats the plurality of test tubes through the single heater, failing to realize temperature uniformity.

SUMMARY

In some embodiments, a temperature control assembly is provided, including a plurality of heating units and a plurality of temperature sensors. The plurality of heating units are arranged in a ring shape, and the plurality of temperature sensors are respectively arranged on the heating units. Each of the heating units includes a bearing hole and a heating body. The heating body surrounds the bearing hole.

In some embodiments, the above temperature control assembly may further include a control panel. The heating body of the each heating unit and each of the temperature sensors are electrically connected to the control panel. The control panel is configured to drive the corresponding heating body according to an operation result of the each temperature sensor.

In some embodiments, a testing instrument is provided, including a turntable, a temperature control assembly, an optical sensor, a rotary shaft, and a rotary motor. The temperature control assembly is fixed to the turntable and includes a control panel, a plurality of heating units, and a plurality of temperature sensors. The plurality of heating units are arranged in a ring shape. The plurality of temperature sensors are respectively arranged on the plurality of heating units and electrically connected to the control panel. Each of the heating units includes a bearing hole and a heating body. The heating body surrounds the bearing hole and is electrically connected to the control panel. The heating body is configured to generate heat. Each of the temperature sensors is configured to sense a temperature. The optical sensor is arranged on an other side of the temperature control assembly opposite to the turntable. The rotary shaft is arranged between the turntable and the rotary motor, and is configured to drive the turntable and the temperature control assembly to rotate, so that the bearing holes of the plurality of heating units are successively moved to the optical sensor.

In some embodiments, each heating body includes a metal-based heat dissipation plate, a first circuit, and a second circuit. The first circuit is arranged on a surface of the metal-based heat dissipation plate and surrounds the bearing hole. The second circuit is arranged on the surface of the metal-based heat dissipation plate, electrically isolated from the first circuit, and electrically connected to the corresponding temperature sensor. The first circuit generates heat by converting electricity to heat.

In some embodiments, the each heating body may further include at least one thermally conductive adhesive configured to adhere the first circuit and the second circuit to the surface of the metal-based heat dissipation plate.

In some embodiments, the each heating body may further include a third circuit. The third circuit is arranged on an other surface of the metal-based heat dissipation plate and electrically connected to the first circuit through at least one conductor. The at least one conductor may be at least one of a via or a wire.

In some embodiments, the each heating body may further include at least one thermally conductive adhesive. The thermally conductive adhesive is configured to adhere the first circuit and the second circuit to the surface of the metal-based heat dissipation plate and the third circuit to the other surface of the metal-based heat dissipation plate.

In some embodiments, the above temperature control assembly may further include a plurality of first connectors and a plurality of wire sets. Each of the first connectors has a plurality of contacts. The plurality of wire sets respectively correspond to the plurality of heating units and the plurality of first connectors. Each of the wire sets has a plurality of wires. One ends of the plurality of wires of the each wire set are respectively electrically connected to the first circuit and the second circuit of the corresponding heating unit, and other ends of the plurality of wires are respectively coupled to the plurality of contacts of the corresponding first connector.

In some embodiments, the above control panel may include a plurality of second connectors, a circuit substrate, and a control circuit. The control circuit is arranged on the circuit substrate, and is electrically connected to the each heating unit and the each temperature sensor. The second connectors are arranged on the circuit substrate and electrically connected to the control circuit. The plurality of second connectors respectively match the plurality of first connectors, and each are pluggably engaged with the corresponding first connector. The control circuit is configured to receive an operation result of each of the temperature sensors through the second circuit and supply power to the first circuit of the heating unit corresponding to the temperature sensor according to the operation result of the each temperature sensor.

In some other embodiments, the above each heating body includes a thermally insulative fastener, a heating block, and a thin-film electric heating piece. The thin-film electric heating piece is sandwiched between the thermally insulative fastener and the heating block. The each temperature sensor is arranged on the thin-film electric heating piece of the corresponding heating unit, and the bearing hole extends through the thermally insulative fastener, the thin-film electric heating piece, and the heating block of the corresponding heating unit.

In some embodiments, the above temperature control assembly may further include an electrically and thermally insulative base. The plurality of heating units surround and are fixed to the electrically and thermally insulative base. In the testing instrument, the electrically and thermally insulative base may be further fixed to the turntable. in this case, two ends of the rotary shaft are respectively connected to the electrically and thermally insulative base and the rotary motor.

In other embodiments, the plurality of heating units may be directly fixed to the turntable.

In some embodiments, the testing instrument may further include a fan assembly, and the fan assembly is arranged on an other side of the temperature control assembly opposite to the turntable.

To sum up, in any of the embodiments, the temperature control assembly is applicable to the testing instrument, wherein the temperature control assembly can independently monitor temperatures of individual test tubes. In some embodiments, the temperature control assembly uses a mechanism design with a reduced mass, which simplifies the structure. In some embodiments, in the temperature control assembly, an aluminum substrate (that is, used as the metal-based heat dissipation plate) is used for manufacturing the heating unit.

DETAILED DESCRIPTION

Figure 1:
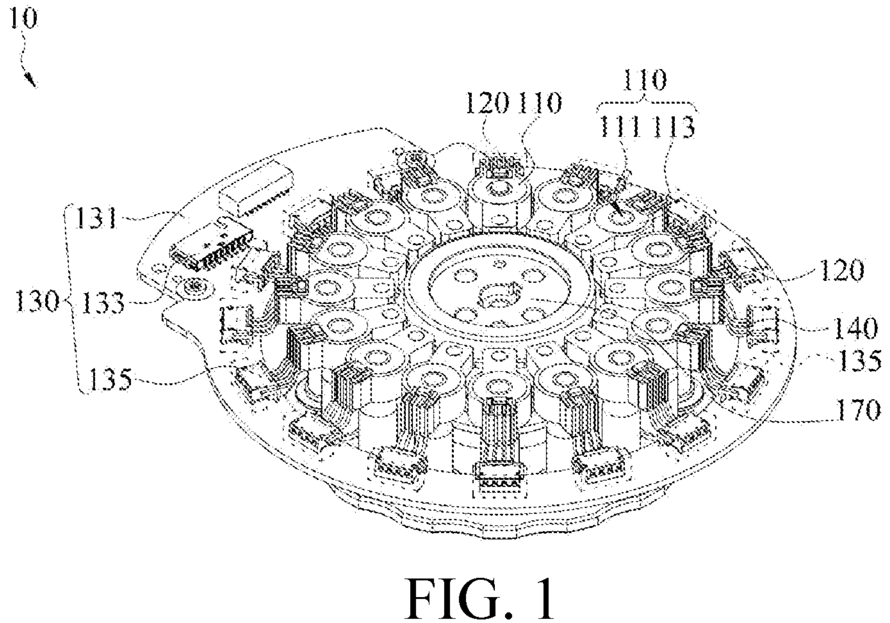
FIG. 1 is a schematic diagram of a temperature control assembly according to an embodiment.
Figure 2:
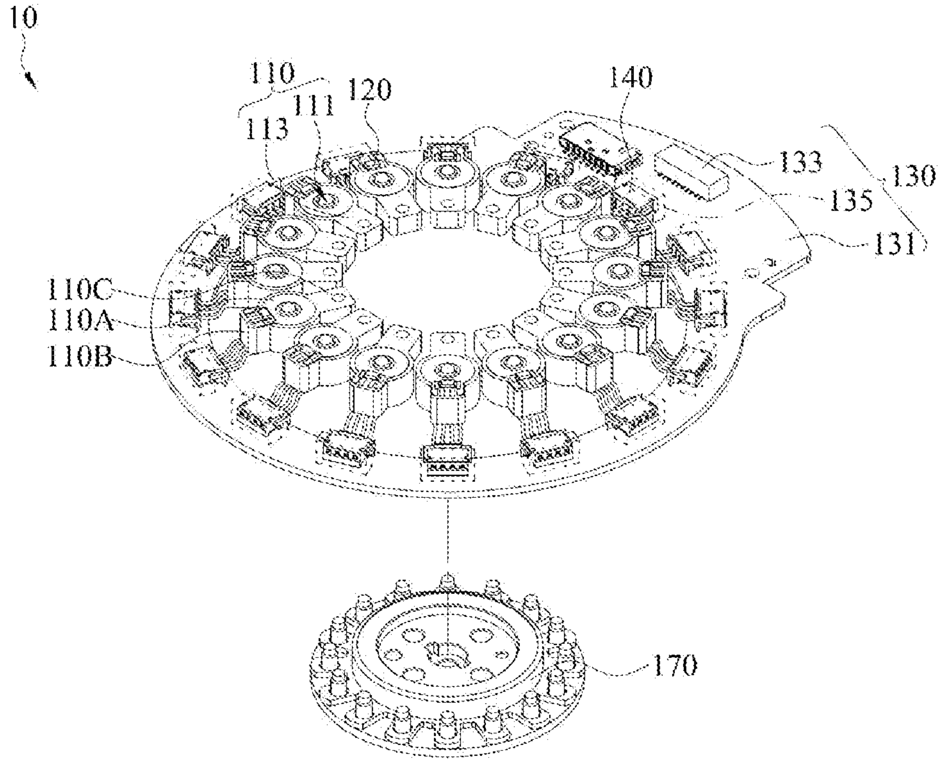
FIG. 2 is an exploded view of the temperature control assembly in FIG. 1.

Referring to FIG. 1 and FIG. 2, a temperature control assembly 10 includes a plurality of heating units 110 and a plurality of temperature sensors 120. Each of the heating units 110 may be configured to adjust a temperature of a sample in a test tube 20. That is to say, the temperature control assembly 10 can simultaneously monitor temperatures of a plurality of test tubes 20 (including the samples inside) and effectively control the temperatures of the plurality of test tubes 20, thereby realizing temperature uniformity.

The heating units 110 are arranged in a ring shape. In other words, long axes of the heating units 110 are radial. The plurality of temperature sensors 120 are respectively arranged on the plurality of heating units. The plurality of temperature sensors 120 are in a one-to-one-correspondence with the plurality of heating units 110, and each of the temperature sensors 120 is arranged on the corresponding heating unit 110. In some embodiments, the each temperature sensor 120 may be directly soldered to the heating unit 110. In some embodiments, the each temperature sensor 120 may be a resistance temperature detector (RTD Sensor).

Figure 3:
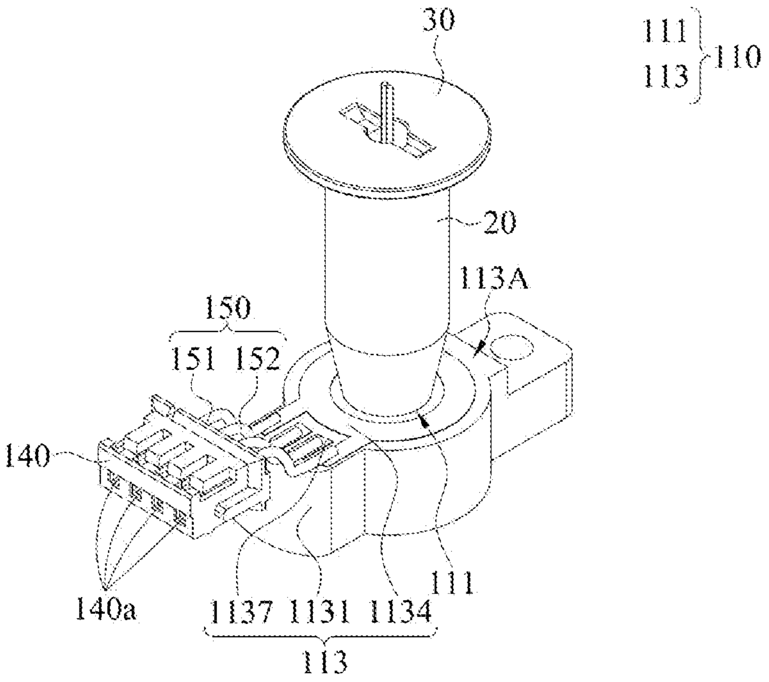
FIG. 3 is a schematic diagram of a first exemplary example of a combination of a heating unit and a temperature sensor in FIG. 1 from a perspective.
Figure 4:
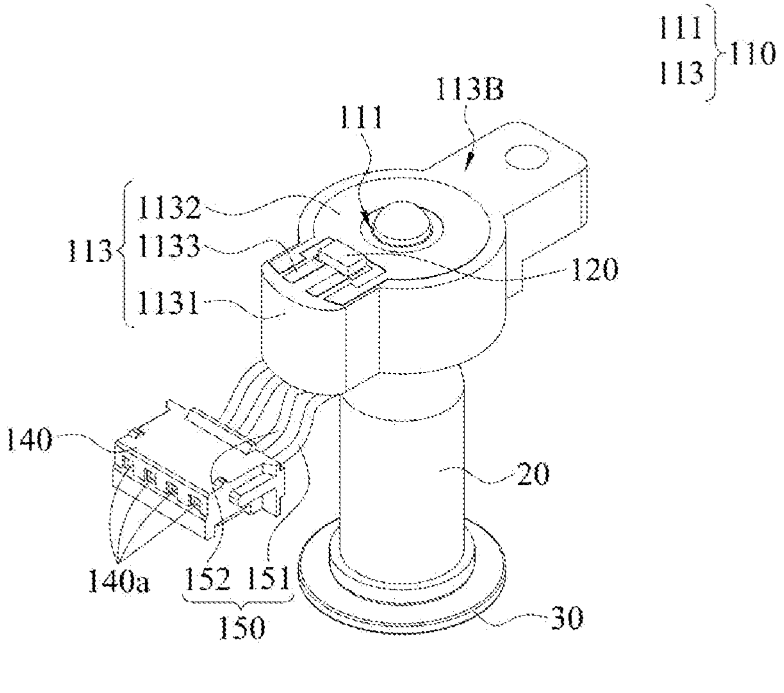
FIG. 4 is a schematic diagram of the same combination of a heating unit and a temperature sensor from an opposite perspective of FIG. 3.

Referring to FIG. 3 and FIG. 4, each of the heating units 110 includes a bearing hole 111 and a heating body 113. The heating body 113 surrounds the bearing hole 111. In other words, the heating body 113 is a main body of the heating unit 110, and the bearing hole 111 is a hole on the main body (that is, the heating body 113).

In use, the test tube 20 may be removably arranged in the bearing hole 111, and the heating body 113 heats the test tube 20 arranged in the bearing hole 111, so that the test tube 20 (including the sample inside) can reach a required temperature.

The each temperature sensor 120 is arranged on the heating body 113 of the corresponding heating unit 110 and adjacent to the bearing hole 111. In use, the temperature sensor 120 may perform temperature sensing to obtain a surrounding temperature (which is equivalent to obtaining the temperature of the test tube 20).

In some embodiments, referring to FIG. 1 to FIG. 4, the each heating unit 110 may be divided into an arrangement segment 110A, a connecting segment 110B, and a fixing segment 110C. The connecting segment 110B and the fixing segment 110C are connected to the arrangement segment 110A. In other words, the arrangement segment 110A extends outward to form the connecting segment 110B and the fixing segment 110C. The connecting segment 110B extends away from a center of the temperature control assembly 10 from the arrangement segment 110A, so as to facilitate electrical connection to an external assembly (that is, the control panel 130). The fixing segment 110C is configured to fix the heating unit 110 on other assemblies, so that the temperature control assembly 10 can be assembled with the external assemblies. In an exemplary embodiment, the heating units 110 are arranged in a ring shape, and the fixing segments 110C of the heating unit 110 are locked on other assemblies (such as an electrically and thermally insulative base 170 or a turntable).

The bearing hole 111 is located at the arrangement segment 110A. In an exemplary example, the bearing hole 111 may be a through hole. In other words, the bearing hole 111 extends through the arrangement segment 110A (that is, a middle segment of the heating body 113) from an upper surface 113A of the arrangement segment 110A (that is, the middle segment of the heating body 113) to a lower surface 113B of the arrangement segment 110A (that is, the middle segment of the heating body 113).

In some embodiments, the temperature sensor 120 may be arranged at a joint of the arrangement segment 110A and the connecting segment 110B.

In some embodiments, the temperature control assembly 10 may further include a control panel 130. The heating body 113 of the each heating unit 110 and the each temperature sensor 120 are electrically connected to the control panel 130. In use, the control panel 130 receives an operation result of the each temperature sensor 120 and drives the heating body 113 of the corresponding heating unit 110 according to the operation result of the each temperature sensor 120. Specifically, a temperature (that is, the operation result) sensed by the temperature sensor 120 is transmitted to the control panel 130. Therefore, when a sample detection program is executed to a temperature raising time point, the control panel 130 may supply power to (drive) the heating body 113 of the corresponding heating unit 110 according to the temperature sensed by the each temperature sensor 120, so that the heating body 113 generates by converting electricity, and then heats the test tube 20 (i.e. heats the sample the test tube 20) to a desired temperature.

Figure 5:
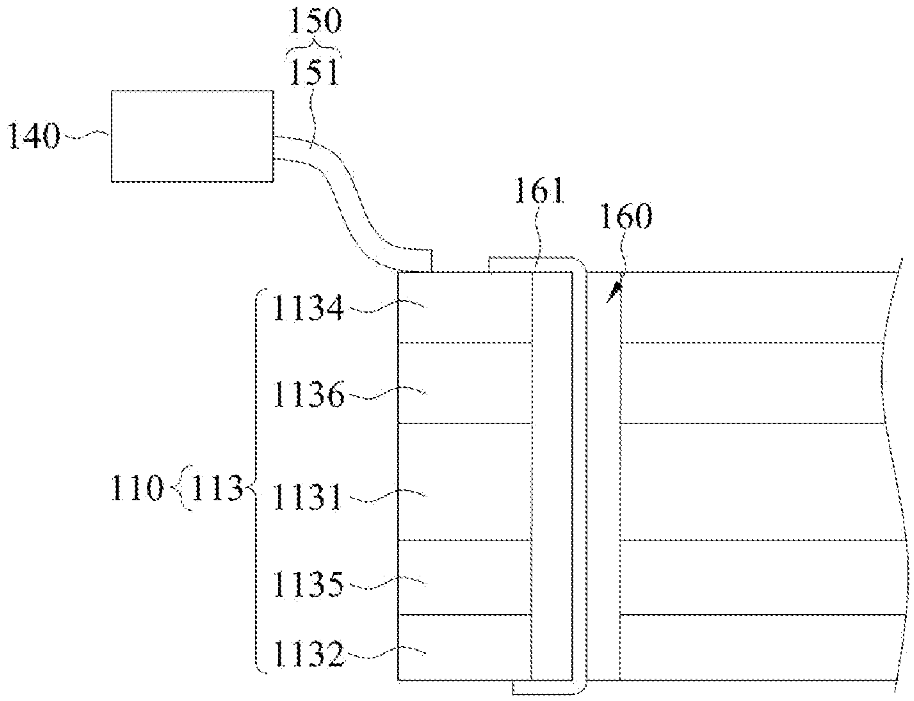
FIG. 5 is a schematic cross-segmental view of the heating unit of FIG. 3 at a tangent of an extension axis.

In some embodiments, referring to FIG. 3 to FIG. 5, the each heating body 113 includes a metal-based heat dissipation plate 1131, a first circuit, 1132 and a second circuit 1133. The first circuit 1132 is arranged on a surface (that is, a lower surface 113B) of the metal-based heat dissipation plate 1131 and surrounds the bearing hole 111. Like the first circuit 1132, the second circuit 1133 is also located on the surface of the metal-based heat dissipation plate 1131, and is electrically isolated from the first circuit 1132. When power is supplied to the first circuit 1132, the first circuit 1132 can generate heat by converting electricity. The second circuit 1133 is electrically connected to the corresponding temperature sensor 120. Specifically, the temperature sensor 120 corresponding to the heating unit 110 is soldered to the second circuit 1133, and is electrically connected to the control panel 130 by the second circuit 1133. The temperature sensed by the temperature sensor 120 may be transmitted to the control panel 130 through the second circuit 1133.

In some embodiments, the each heating body 113 may further include at least one thermally conductive adhesive 1135. The thermally conductive adhesive 1135 is configured to adhere the first circuit 1132 and the second circuit 1133 to the lower surface 113B of the metal-based heat dissipation plate 1131.

In some embodiments, the each heating body 113 may further include a third circuit 1134. The third circuit 1134 is arranged on an other surface (that is, an upper surface 113A) of the metal-based heat dissipation plate 1131 and electrically connected to the first circuit 1132 through at least one conductor 161 and/or 162. The conductors 161 and 162 may be vias (not shown) or wires (shown in FIG. 5). When power is supplied to the heating body 113, the power is supplied to the first circuit 1132 and the third circuit 1134, so that the first circuit 1132 and the third circuit 1134 can generate heat by converting electricity, thereby performing double-sided heating. The conductors 161 and 162 both may be vias or wires. Alternatively, according to actual requirements, a part of the conductors 161 and 162 is a via, and the other part of the conductors 161 and 162 is a wire.

In some embodiments, referring to FIG. 5, the conductor 161 may be connected internally. For example, the conductor is a wire extending through the metal-based heat dissipation plate 1131. In other words, the wire is coupled (for example, soldered) to the first circuit 1132 and the third circuit 1134 on different surfaces through a through hole 160 extending through the metal-based heat dissipation plate 1131. In some embodiments, the conductor 161 may be a via formed by filling or coating a conductive material in the through hole 160 extending through the metal-based heat dissipation plate 1131. The conductive materials at two ends of the through hole 160 are respectively electrically connected to the first circuit 1132 and the third circuit 1134 surrounding the through hole 160.

Figure 6:
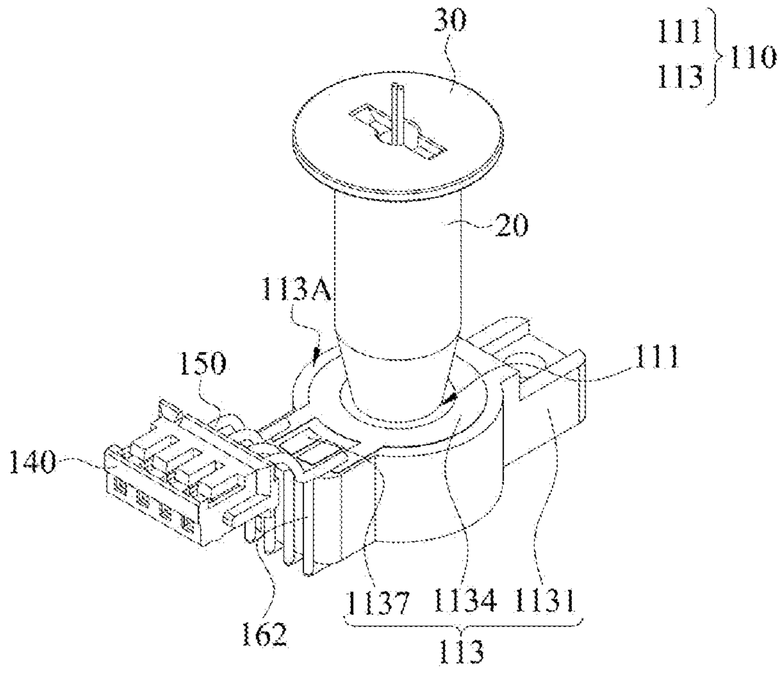
FIG. 6 is a schematic diagram of a second exemplary example of a combination of a heating unit and a temperature sensor in FIG. 1 from a perspective.
Figure 7:
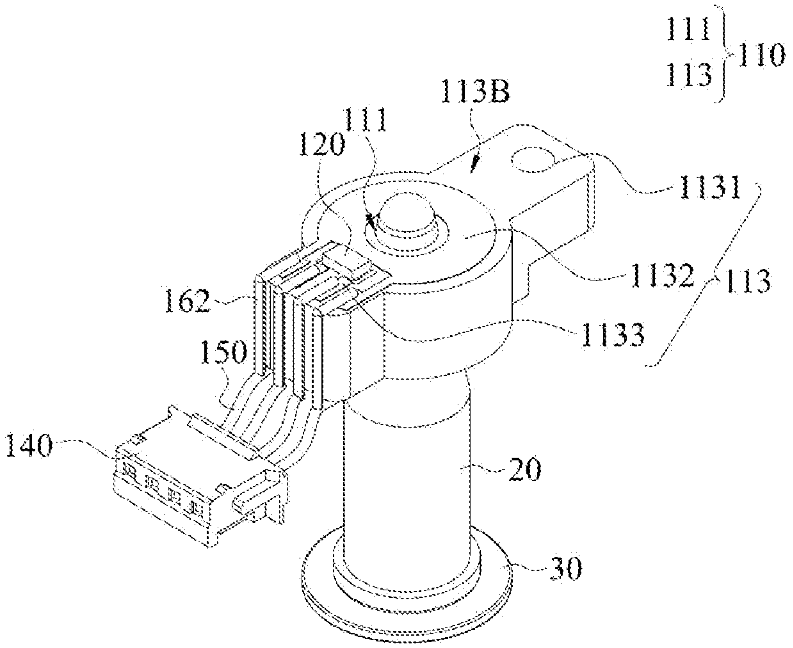
FIG. 7 is a schematic diagram of the same combination of a heating unit and a temperature sensor from an opposite perspective of FIG. 6.
Figure 8:
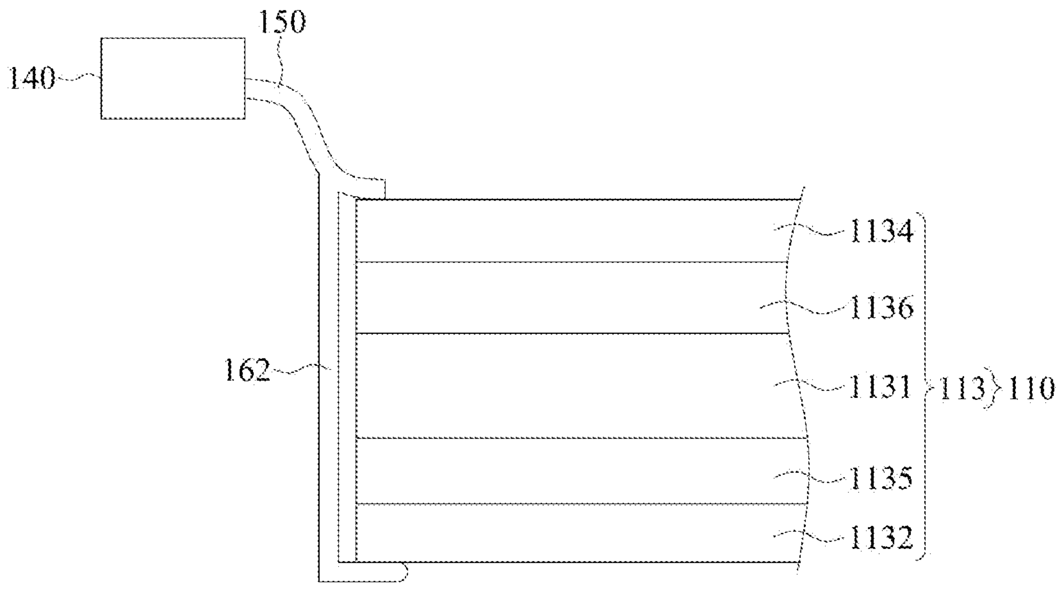
FIG. 8 is a schematic cross-segmental view of the heating unit of FIG. 6 at a tangent of an extension axis.

In some embodiments, referring to FIG. 6 to FIG. 8, the conductor 162 may be connected externally. That is to say, the conductor is a wire located on a sidewall of the metal-based heat dissipation plate 1131. In other words, the wire extends from the upper surface 113A of the metal-based heat dissipation plate 1131 to the lower surface 113B of the metal-based heat dissipation plate 1131 along the side wall of the metal-based heat dissipation plate 1131, and two ends of the wire are respectively coupled (for example, soldered) to the first circuit 1132 and the third circuit 1134 on different surfaces.

Figure 9:
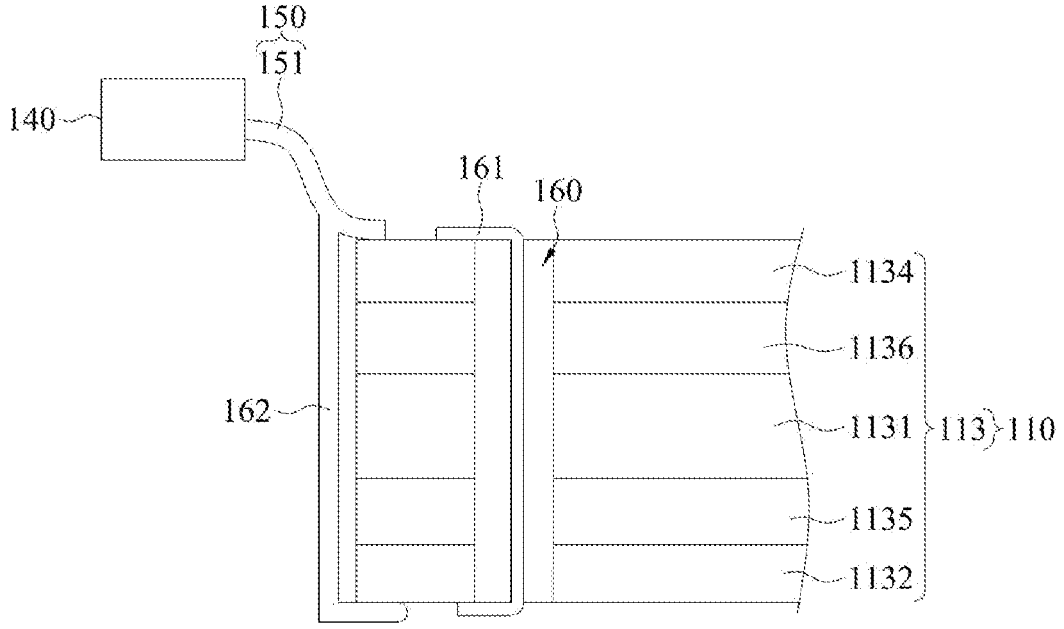
FIG. 9 is a schematic cross-segmental view of a third exemplary example of a heating unit.

In some embodiments, referring to FIG. 9, the each heating body 113 may be provided with both an internal connection and an external connection, that is, has a plurality of conductors 161 and 162 arranged in different manners.

In some embodiments, the each heating body 113 may further include at least one thermally conductive adhesive 1135 and 1136. The thermally conductive adhesive 1135 is configured to adhere the first circuit 1132 and the second circuit 1133 to the lower surface 113B of the metal-based heat dissipation plate 1131. The thermally conductive adhesive 1136 is configured to adhere the third circuit 1134 to the upper surface 113A of the metal-based heat dissipation plate 1131.

In some embodiments, the each heating body 113 may further include a fourth circuit 1137. The fourth circuit 1137 is arranged on the upper surface 113A of the metal-based heat dissipation plate 1131, and is electrically isolated from the third circuit 1134. The fourth circuit 1137 is electrically connected to the third circuit 1134 through at least one conductor (not shown). The conductor coupling the third circuit 1134 to the fourth circuit 1137 may be a via (not shown) or a wire (not shown).

In some embodiments, the thermally conductive adhesive 1136 can adhere the third circuit 1134 and the fourth circuit 1137 to the upper surface 113A of the metal-based heat dissipation plate 1131.

In some embodiments, the metal-based heat dissipation plate 1131 may be a low-alloy aluminum-magnesium-silicon (Al—Mg—Si)-based high-plasticity alloy plate. The first circuit 1132 and the second circuit 1133 may be copper foils. The third circuit 1134 and the fourth circuit 1137 may be copper foils.

In some embodiments, referring to FIG. 1 and FIG. 2, the control panel 130 may include a circuit substrate 131 and a control circuit 133. The control circuit 133 is arranged on the circuit substrate 131. The control circuit 133 is electrically connected to the each heating unit 110 and the each temperature sensor 120. In use, the control circuit 133 may receive the temperature sensed by the each temperature sensor 120 through the second circuit 1133 (and the fourth circuit 1137) of each heating unit 110, and supply power to the first circuit 1132 of the heating unit 110 corresponding to the temperature sensor 120 according to the temperature sensed by the each temperature sensor 120, so as to cause the heating body 113 to generate heat.

In some embodiments, the control panel 130 and the each heating unit 110 may be electrically connected through two connectors engaged with each other. In these embodiments, referring to FIG. 1 to FIG. 5, the temperature control assembly 10 may further include a plurality of first connectors 140 and a plurality of wire sets 150. The plurality of first connectors 140 respectively correspond to the plurality of heating units 110. Each of the first connectors 140 has a plurality of contacts 140*a*. The plurality of wire sets 150 respectively correspond to the plurality of heating units 110 and respectively correspond to the plurality of first connectors 140. Each of the wire sets 150 has a plurality of wires 151 and 152. One ends of the plurality of wires 151 and 152 of the each wire set 150 are respectively electrically connected to the first circuit 1132 and the second circuit 1133 of the heating unit 110 corresponding to the wire set 150, and other ends of the plurality of wires are respectively coupled to the plurality of contacts 140*a* of the first connector 140 corresponding to the wire set 150.

Specifically, in the each wire set 150, the one end of each of the wires 151 is coupled (for example, soldered or attached) to the first circuit 1132 of the corresponding heating unit 110, or is coupled (for example, soldered or attached) to the third circuit 1134 of the corresponding heating unit 110, and is electrically connected to the first circuit 1132 through the third circuit 1134 and the conductors 161 and/or 162. The other end of the each wire 151 is coupled (for example, attached) to one of the plurality of contacts 140*a* of the corresponding first connector 140. The one end of each of the wires 152 is coupled (for example, soldered or attached) to the second circuit 1133 of the corresponding heating unit 110, or is coupled (for example, soldered or attached) to the fourth circuit 1137 of the corresponding heating unit 110, and is electrically connected to the second circuit 1133 through the fourth circuit 1137 and the conductors 161 and/or 162. The other end of the each wire 152 is coupled (for example, attached) to another of the plurality of contacts 140*a* of the corresponding first connector 140.

In some embodiments, referring to FIG. 1 and FIG. 2, the control panel 130 may further include a plurality of second connectors 135. The second connectors 135 are arranged on the circuit substrate 131 and electrically connected to the control circuit 133. The plurality of second connectors 135 respectively match the plurality of first connectors 140, and each of the second connectors 135 is pluggably engaged with the corresponding first connector 140. In other words, when the first connector 140 is plugged into the corresponding second connector 135, the plurality of contacts 140*a* of the first connector 140 are in one-to-one contact with the plurality of contacts of the second connector 135, so that the plurality of contacts 140*a* of the first connector 140 are respectively electrically connected to the plurality of contacts of the second connector 135. The second connector 135 is drawn in dashed lines in FIG. 1 and FIG. 2 to facilitate presentation of the first connector 140 into the second connector.

Therefore, in use, the control circuit 133 may receive, through the each second connector 135, the first connector 140 engaged with the second connector 135, the wire 152 connected to the first connector 140, and the second circuit 1133 connected to the wire 152, the temperature sensed by the each temperature sensor 120. Moreover, the control circuit 133 determines, according to the received temperature and an expected temperature, whether the heating unit 110 corresponding to the temperature sensor 120 is required to be heated. When the received temperature is lower than the expected temperature, the control circuit 133 supplies power to the first circuit 1132 (that is, supplies power to the heating body 113) of the heating unit 110 corresponding to the temperature sensor 120 through the each second connector 135, the first connector 140 engaged with the second connector 135, and the wire 151 connected to the first connector 140, so that the heating body 113 generates heat to increase the temperature of the test tube 20 carried by the heating unit 110. On the contrary, the control circuit 133 stops supplying power to the heating unit 110 corresponding to the temperature sensor 120.

In some embodiments, the bearing hole 111 extends through the metal-based heat dissipation plate 1131. The first circuit 1132 is distributed on the lower surfaces 113B of the arrangement segment 110A and the connecting segment 110B. The first circuit 1132 may include an annular wiring and two connection wirings (which are referred to as first connection wirings below). The first circuit 1132 on the arrangement segment 110A is an annular wiring, which is arranged on the lower surface 113B of the metal-based heat dissipation plate 1131 beside the bearing hole 111 along an edge of the bearing hole 111. The first circuit 1132 on the connecting segment 110B is a first connection wiring, which extends toward an edge of the metal-based heat dissipation plate 1131 from the annular wiring, and extends to the edge of the metal-based heat dissipation plate 1131 through the connecting segment 110B. That is to say, one ends (which are referred to as first ends below) of the two first connection wirings are coupled to the annular wiring, and other ends (which are referred to as second ends below) may be connected to the control panel 130 directly or through the wires 151. The second circuit 1133 is distributed on the lower surface 113B of the connecting segment 110B. The second circuit 1133 may include another two connection wirings (which are referred to as second connection wirings below). The second connection wirings extend toward the edge of the metal-based heat dissipation plate 1131 from the joint of the arrangement segment 110A and the connecting segment 110B, and extends to the edge of the metal-based heat dissipation plate 1131 through the connecting segment 110B. At the joint of the arrangement segment 110A and the connecting segment 110B, the temperature sensor 120 is soldered to one ends (which are referred to as first ends) of the second connection wirings, that is, the first ends of the two second connection wirings are respectively coupled to the two electrodes of the temperature sensor 120. On the edge of the metal-based heat dissipation plate 1131, other ends of the second connection wirings (which are referred to as second ends below) may be connected to the control panel 130 directly or through the wires 152. The two second connection wirings of the second circuit 1133 may be distributed between the two first connection wirings of the first circuit 1132.

The third circuit 1134 is distributed on the upper surfaces 113A of the arrangement segment 110A and the connecting segment 110B, and a structure and a distribution thereof are substantially the same as those of the first circuit 1132. The conductors 161 and/or 162 connecting the upper surface 113A to the lower surface 113B of the metal-based heat dissipation plate 1131 electrically connect the third circuit 1134 to the first circuit 1132.

In an example, the each wire set 150 may include four wires, that is, two wires 151 and two wires 152. One ends of the two wires 151 are respectively soldered to the second ends of the two first connection wirings of the third circuit 1134, and other ends of the two wires 151 respectively contact two contacts 140*a* of the first connector 140. One ends of the two wires 152 are respectively soldered to the second ends of the two first connection wirings of the fourth circuit 1137, and other ends of the two wires 151 respectively contact other two contacts 140*a* of the first connector 140.

For example, the first circuit 1132 and the second circuit 1133 may be patterned circuit layers formed on the lower surface 113B of the metal-based heat dissipation plate 1131. The patterned circuit layer may be formed on the lower surface 113B of the metal-based heat dissipation plate 1131 by using a printed circuit board (PCB) process. The third circuit 1134 and the fourth circuit 1137 may be patterned circuit layers formed on the upper surface 113A of the metal-based heat dissipation plate 1131. The patterned circuit layer may be formed on the upper surface 113A of the metal-based heat dissipation plate 1131 by using a PCB process.

In some embodiments, the metal-based heat dissipation plate 1131 can have desirable thermal conductivity, electrical insulation properties, and machinability. The metal-based heat dissipation plate 1131 may be an aluminum substrate. The aluminum substrate can carry a higher current, can withstand a voltage up to 4500 V, and has a thermal conductivity greater than 2.0. The first circuit 1132 and the second circuit 1133 may be a patterned aluminum foil. The third circuit 1134 and the fourth circuit 1137 may be another patterned aluminum foil.

In some embodiments, the temperature control assembly 10 may further include an electrically and thermally insulative base 170. The plurality of heating units 110 surround the electrically and thermally insulative base 170 along an edge of the electrically and thermally insulative base 170, and are fixed to the electrically and thermally insulative base 170. For example, the fixing segment 110C of the each heating unit 110 is locked on the electrically and thermally insulative base 170. In some embodiments, the electrically and thermally insulative base 170 may be a bakelite heat-blocking material.

In some embodiments, the temperature control assembly 10 may be assembled with other assemblies into an instrument by fixing the electrically and thermally insulative base 170 to the other assemblies.

Specifically, a testing instrument includes the temperature control assembly 10 in any of the above assemblies, a turntable 40, an optical sensor 50, a rotary motor 70, and a rotary shaft 72. The temperature control assembly 10 is arranged between the turntable 40 and the optical sensor 50, and is fixed to the turntable 40 by the electrically and thermally insulative base 170. The optical sensor 50 is arranged on an other side of the temperature control assembly 10 opposite to the turntable 40, and is configured to face upward and to detect the test tube 20 in the bearing hole 111 of the heating unit 110. The rotary motor 70 is connected to one end of the rotary shaft 72, and is configured to rotate the rotary shaft 72. An other end of the rotary shaft 72 is coupled to the electrically and thermally insulative base 170, and is configured to drive the turntable 40 and the temperature control assembly 10 to rotate, so that the bearing holes 111 of the plurality of heating units 110 are successively moved to the optical sensor 50.

Figure 10:
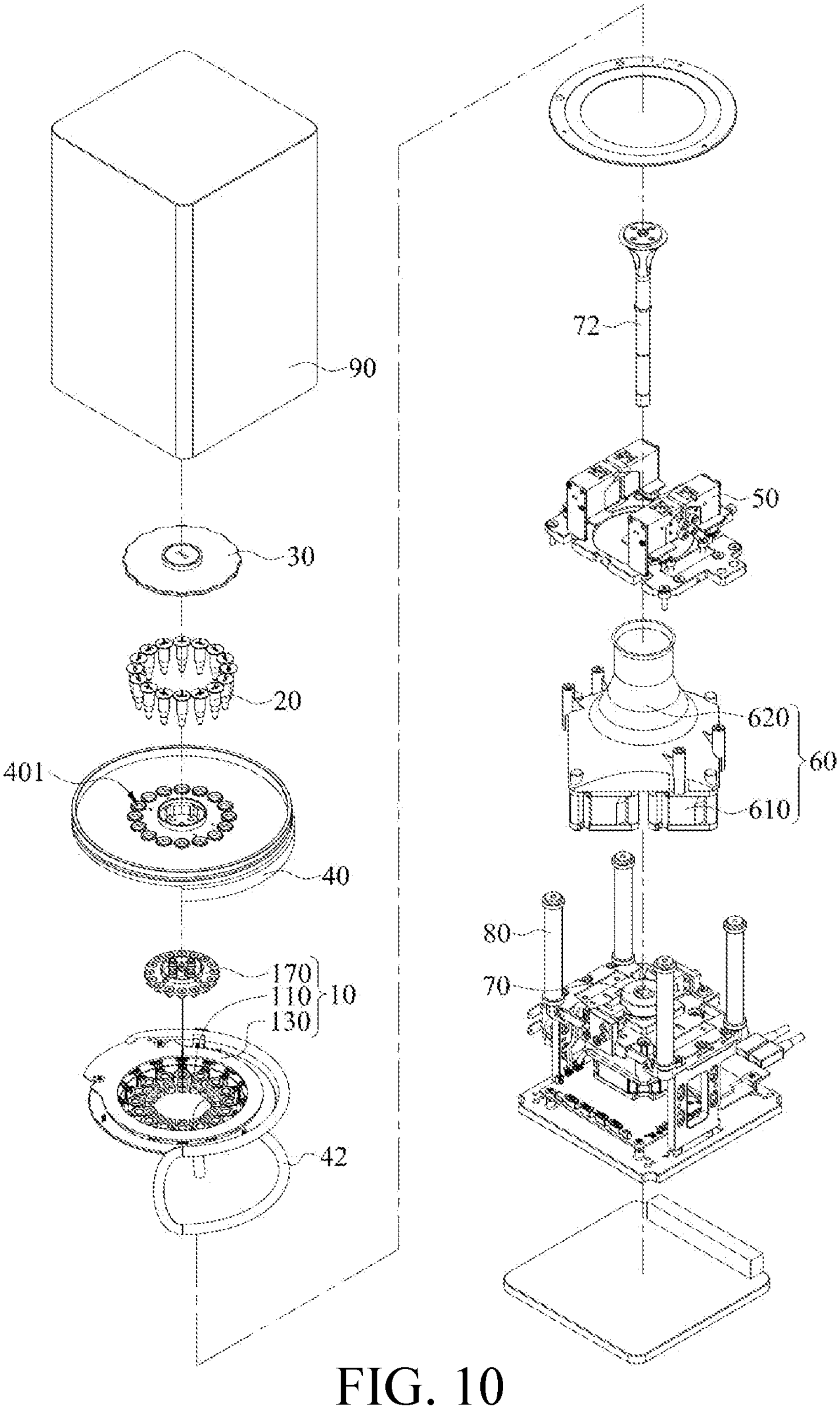
FIG. 10 is an exploded view of a testing instrument according to an embodiment.
Figure 11:
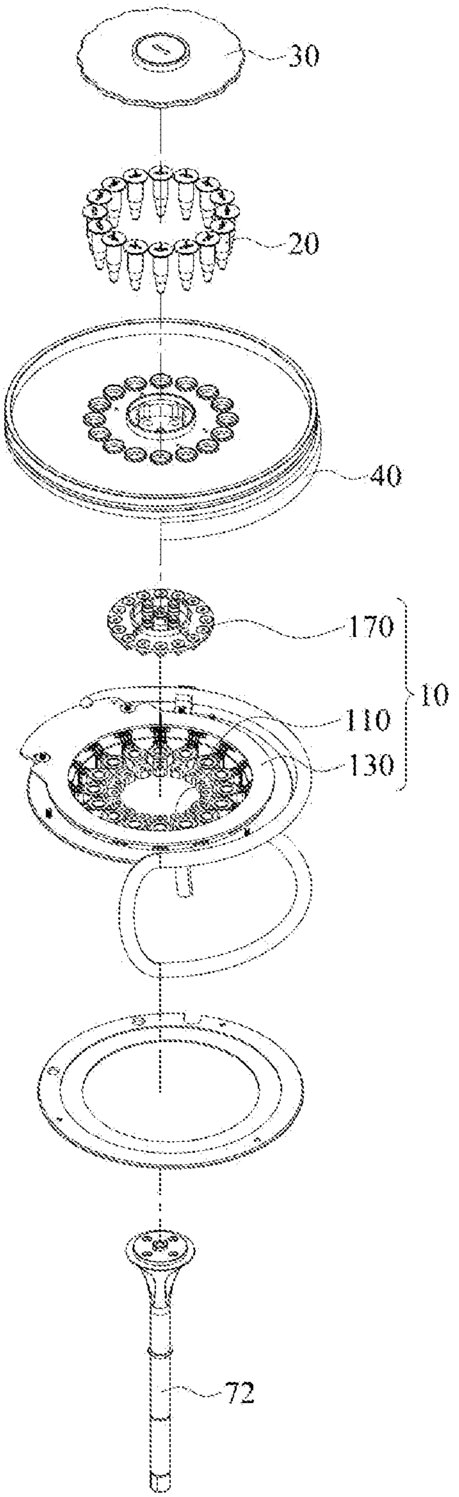
FIG. 11 is a partial enlarged view of FIG. 10.

For example, referring to FIG. 10 and FIG. 11, after the electrically and thermally insulative base 170 is connected and fixed to the 16 sets of heating units 110, the bearing holes 111 of the 16 sets of heating units 110 are respectively aligned with 16 limiting holes 401 on the turntable 40, and then the electrically and thermally insulative base 170 is fixed to the turntable 40. The first connectors 140 of the 16 sets of heating units 110 are plugged into the second connectors 135 of the control panel 130 in a one-to-one correspondence, and a turntable wire 42 is assembled and connected to the turntable 40. Then two ends of the rotary shaft 72 are respectively assembled and connected to the electrically and thermally insulative base 170 and the rotary motor 70 assembled on a rack 80. Finally, the assembled assembly is covered with a casing 90. In use, the test tube 20 is inserted into the bearing hole 111 of the heating unit 110 through the limiting hole 401 on the turntable 40, and an opening of the test tube 20 may be covered with a fixing cover 30.

In some embodiments, the testing instrument may further include a fan assembly 60, and the fan assembly 60 is arranged on an other side of the temperature control assembly 10 opposite to the turntable 40. In some embodiments, the fan assembly 60 may include one or more fans 610 and fan shrouds 620. In this embodiment, the fan shrouds 620 are arranged between the fans 610 and the temperature control assembly 10. Each of the fan shrouds 620 is tapered from an end close to each of the fans 610 toward an end close to the temperature control assembly 10, so as to direct the fan 610 to blow the middle area of the temperature control assembly 10.

Figure 12:
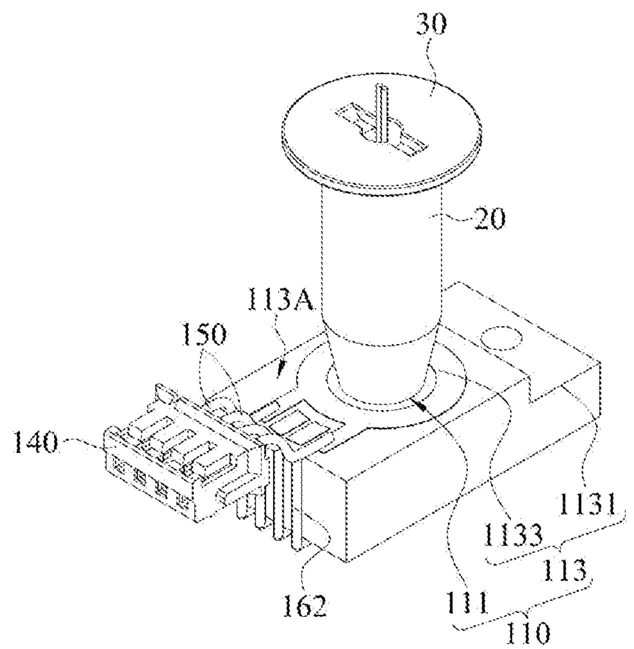
FIG. 12 is a schematic diagram of a third exemplary example of a combination of a heating unit and a temperature sensor in FIG. 1 from a perspective.
Figure 13:
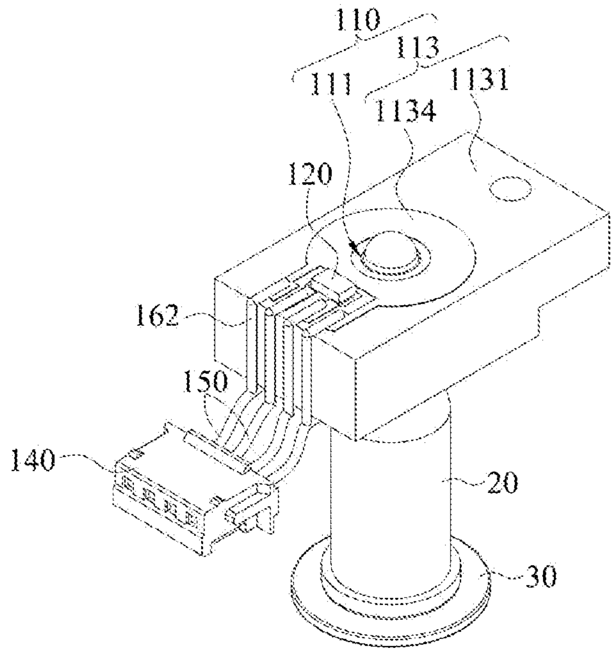
FIG. 13 is a schematic diagram of the same combination of a heating unit and a temperature sensor from an opposite perspective of FIG. 12.

In some embodiments, referring to FIG. 12 and FIG. 13, in a top view, a shape of the each heating unit 110 may be rectangular.

Figure 14:
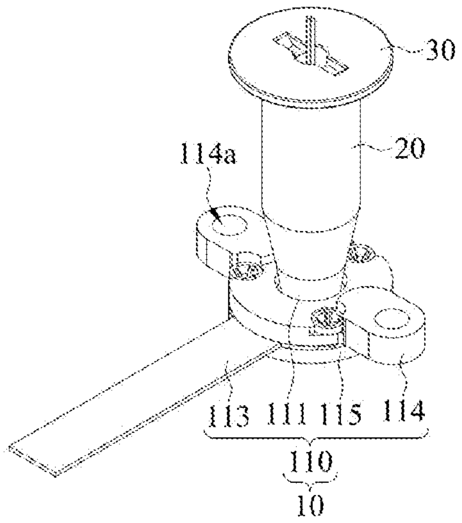
FIG. 14 is a schematic diagram of a fourth exemplary example of a combination of a heating unit and a temperature sensor.
Figure 15:
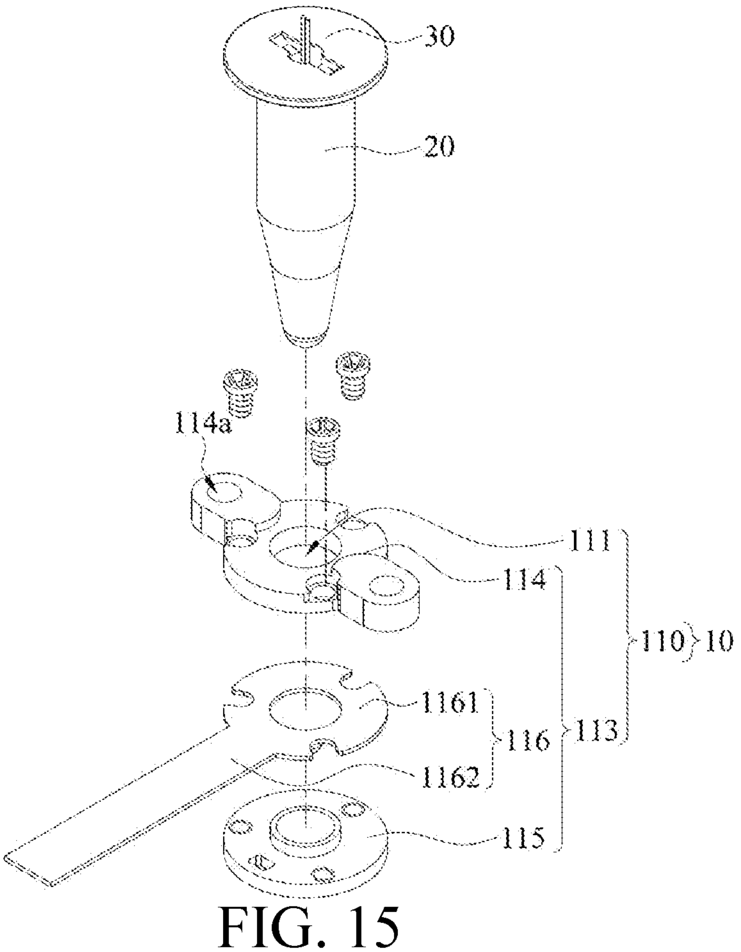
FIG. 15 is an exploded view of a combination of a heating unit and a temperature sensor of FIG. 14.
Figure 16:
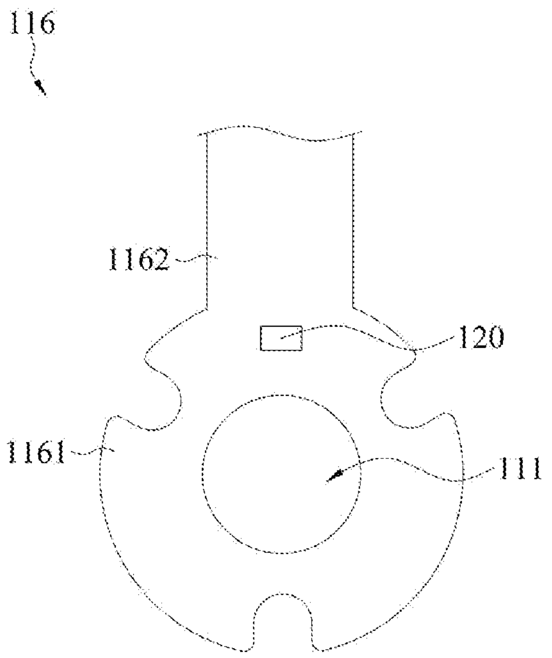
FIG. 16 is an enlarged view of a thin-film electric heating piece of FIG. 14.

In other embodiments, referring to FIG. 14 and FIG. 15, the each heating body 113 may include a thermally insulative fastener 114, a heating block 115, and a thin-film electric heating piece 116. The thin-film electric heating piece 116 is sandwiched between the thermally insulative fastener 114 and the heating block 115. Referring to FIG. 14 to FIG. 16, the each temperature sensor 120 is arranged on the thin-film electric heating piece 116 of the corresponding heating unit 110, and the bearing hole 111 extends through the thermally insulative fastener 114, the thin-film electric heating piece 116, and the heating block 115 of the corresponding heating unit 110.

In some embodiments, referring to FIG. 14 and FIG. 16, each thin-film electric heating piece 116 may include an arrangement segment 1161 and a connecting segment 1162. The arrangement segment 1161 is sandwiched between the thermally insulative fastener 114 and the heating block 115. The connecting segment 1162 is connected to the arrangement segment 1161, and is electrically connected to the control panel 130. The thin-film electric heating piece 116 can generate heat under the power supply of the control panel 130. The each temperature sensor 120 is arranged at a joint of the arrangement segment 1161 and the connecting segment 1162 of the corresponding heating unit 110, and the bearing hole 111 extends through the thermally insulative fastener 114, the arrangement segment 1161, and the heating block 115.

For example, after the thermally insulative fastener 114 and the heating block 115 are aligned, the arrangement segment 1161 of the thin-film electric heating piece 116 is sandwiched therebetween, and then the thermally insulative fastener 114 and the heating block 115 are locked together with screws to form the heating unit 110.

In some embodiments, the connecting segment 1162 may be directly coupled to the control circuit 133 of the control panel 130. For example, one end of the connecting segment 1162 is connected to the arrangement segment 1161, and an other end of the connecting segment 1162 is directly soldered to the control circuit 133 (not shown).

In some other embodiments, the connecting segment 1162 may be electrically connected to the control circuit 133 of the control panel 130 through a wire or a combination of a wire and a connector.

In some embodiments, the each thin-film electric heating piece 116 may be a polyimide (PI) thin-film electric heating piece.

Figure 17:
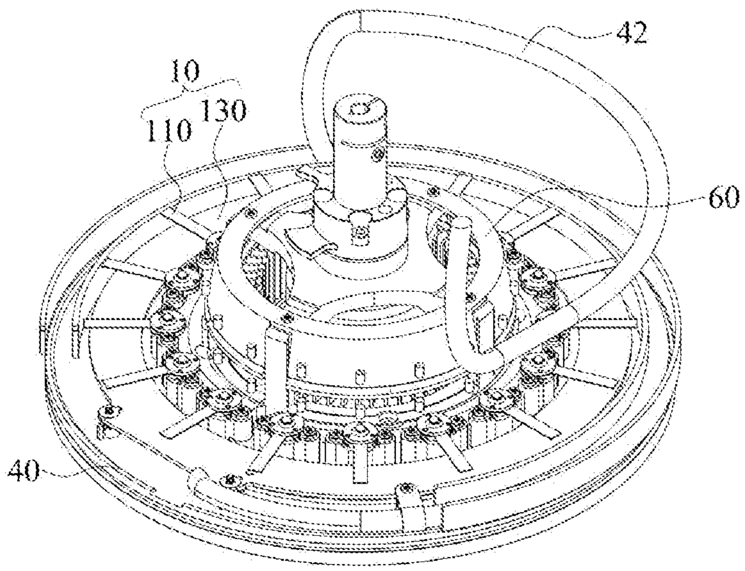
FIG. 17 is a partial schematic diagram of a testing instrument according to another embodiment.
Figure 18:
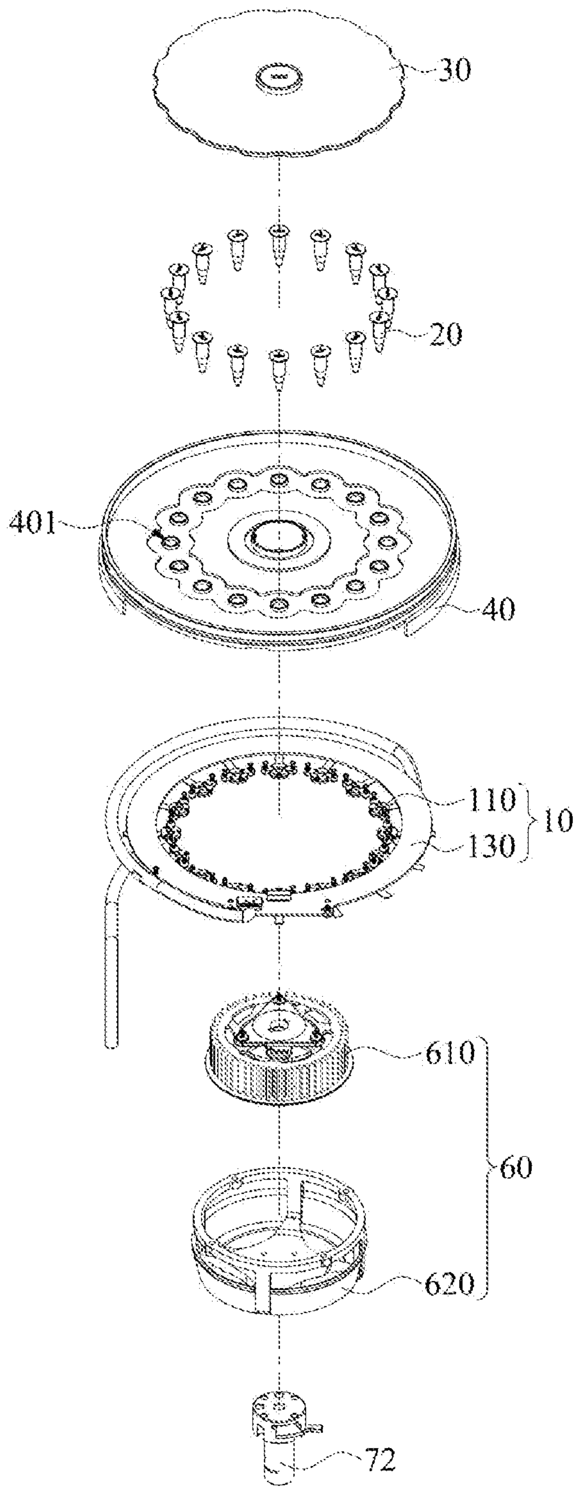
FIG. 18 is a partial reversed exploded view of FIG. 17.
Figure 19:
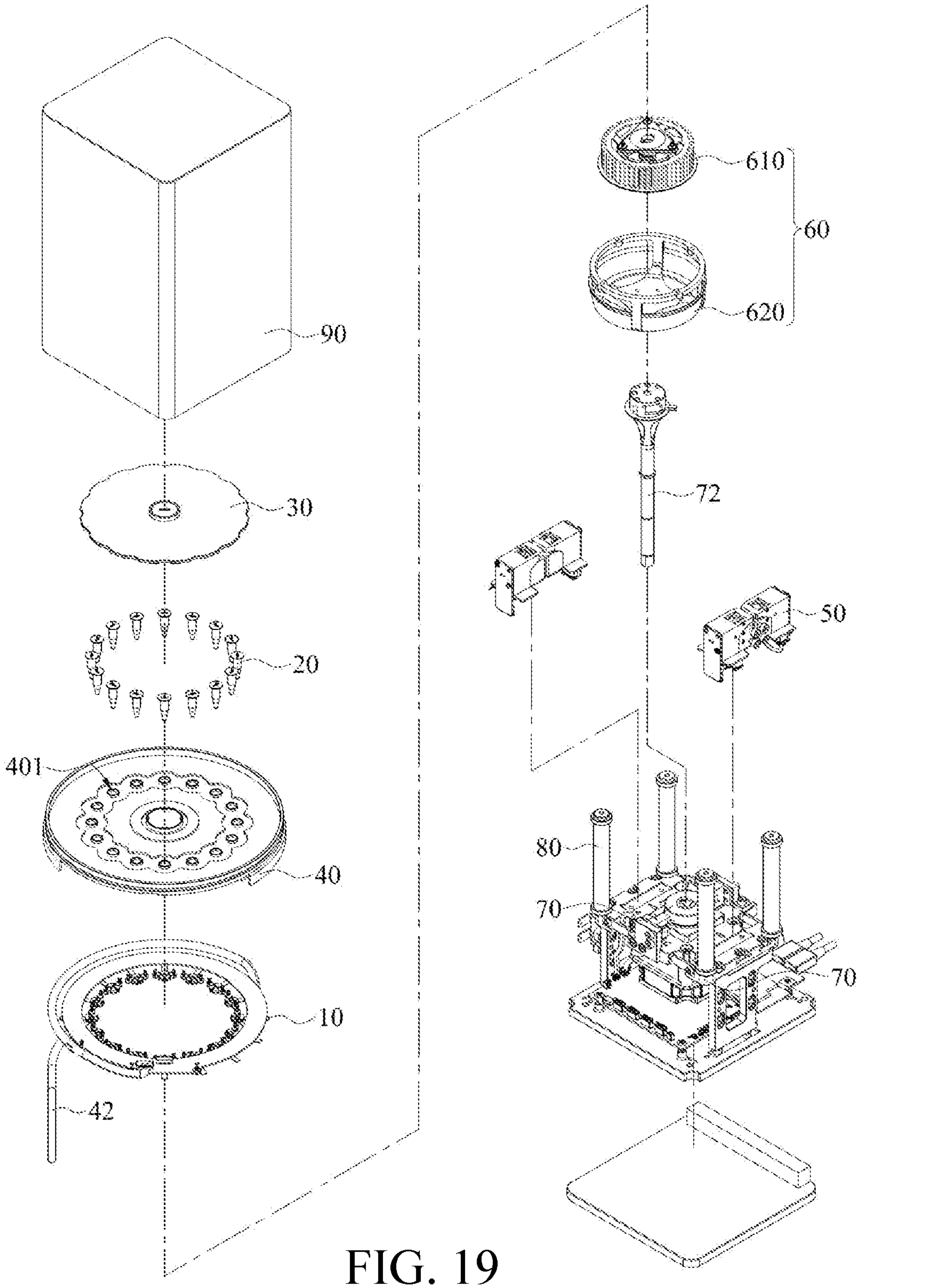
FIG. 19 is an exploded view of a testing instrument according to another embodiment.

In some embodiments, referring to FIG. 17 to FIG. 19, the each heating unit 110 may be directly fixed to the turntable 40 during assembly of the testing instrument. For example, referring to FIG. 14 to FIG. 17, the thermally insulative fastener 114 of the each heating unit 110 has a fixing hole 114*a*. The heating unit 110 may be locked to the turntable 40 by inserting a screw through the fixing hole 114*a* and locking the screw into the turntable 40.

In some embodiments, referring to FIG. 17 to FIG. 19, the fan assembly 60 may be directly fixed to the turntable 40. In these embodiments, the fan assembly 60 is arranged on the other side of the temperature control assembly 10 opposite to the turntable 40, and is fixed to the turntable 40 exposed from a hollow area defined by the heating units 110. In other words, the plurality of heating units 110 of the temperature control assembly 10 surround the fan assembly 60. In addition, the other end of the rotary shaft 72 is connected to the fan assembly 60.

For example, after the bearing holes 111 of the 16 sets of heating units 110 are respectively aligned with the 16 limiting holes 401 of the turntable 40, the thermally insulative fastener 114 of the each heating unit 110 is locked to the turntable 40. Then the fan 610 is locked to the turntable 40 in the middle area defined by the 16 sets of heating units 110. The first connectors 140 of the 16 sets of heating units 110 are respectively engaged with the second connectors 135 at corresponding positions on the control panel 130. The other end of the rotary shaft 72 is assembled to an outer side of the fan shroud 620. Then the fan 610 is covered with the fan shroud 620 and then fixed to the turntable 40.

In this way, the testing instrument can perform the process of detecting the temperature of a sample required to be controlled.

A testing instrument for a PCR is used as an example. The PCR requires a processing temperature of about 94° C. in a first stage, requires a processing temperature of about 60° C. in a second stage, and requires a processing temperature of about 72° C. in a third stage. In the first stage of the PCR, the testing instrument needs to heat the test tube 20 to the temperature of 94° C., and maintain the temperature at 94° C. At this time, the control circuit 133 of the control panel 130 supplies power to the heating unit 110, so that the heating body 113 of the heating unit 110 generates heat to raise the temperature to 94° C., and controls, according to the temperature sensed by the each temperature sensor 120, the operation of the heating unit 110 and the fan 610 through computer program proportional-integral and derivative control (PID control), so as to maintain the temperature at 94° C. In the second stage of the PCR, the control circuit 133 of the control panel 130 stops supplying power to the heating unit 110 to turn off the heating body 113, and turns on the fan 610, so that the fan 610 blows the heating unit 110 through the fan shroud 620 to reduce the temperature to about 60° C. Then, the control circuit 133 of the control panel 130 controls, according to the temperature sensed by the each temperature sensor 120, the operation of the heating unit 110 and the fan 610 through the computer program PID control, to maintain the temperature at about 60° C. In the third stage of the PCR, the control circuit 133 of the control panel 130 supplies power to the heating unit 110 again, so that the heating body 113 of the heating unit 110 generates heat to raise the temperature to 72° C., and controls, according to the temperature sensed by the each temperature sensor 120, the operation of the heating unit 110 and the fan 610 through the computer program PID control, so as to maintain the temperature at 72° C.

To sum up, in any of the embodiments, the temperature control assembly 10 is applicable to the testing instrument, wherein the temperature control assembly can independently monitor temperatures of individual test tubes 20. Therefore, the temperature control assembly 10 can effectively control the temperatures of individual test tubes 20, such that the temperature uniformity of the test tubes 20 is increased. In some embodiments, the temperature control assembly 10 uses the mechanism design with a reduced mass, which simplifies the structure. In some embodiments, in the temperature control assembly 10, an aluminum substrate (that is, used as the metal-based heat dissipation plate 1131) is used for manufacturing the heating unit 110.

What is claimed is:

1. A temperature control assembly, comprising:
- a plurality of heating units, arranged in a ring shape and each comprising:
  - a bearing hole; and
  - a heating body, surrounding the bearing hole;
- a plurality of temperature sensors, respectively arranged on the plurality of heating units; and
- an electrically and thermally insulative base, wherein the plurality of heating units surround and are fixed to the electrically and thermally insulative base.

2. The temperature control assembly according to claim 1, further comprising:
- a control panel, electrically connected to the heating body of the each heating unit and each of the temperature sensors and configured to drive the corresponding heating body according to an operation result of the each temperature sensor.

3. The temperature control assembly according to claim 1, wherein the heating body of the each heating unit comprises:
- a metal-based heat dissipation plate;
- a first circuit, arranged on a surface of the metal-based heat dissipation plate and surrounding the bearing hole; and
- a second circuit, arranged on the surface of the metal-based heat dissipation plate, electrically isolated from the first circuit, and electrically connected to the corresponding temperature sensor.

4. The temperature control assembly according to claim 3, wherein each heating body further comprises:
- at least one thermally conductive adhesive, configured to adhere the first circuit and the second circuit to the surface of the metal-based heat dissipation plate.

5. The temperature control assembly according to claim 3, wherein each heating body further comprises:
- a third circuit, arranged on an other surface of the metal-based heat dissipation plate and electrically connected to the first circuit through at least one conductor.

6. The temperature control assembly according to claim 5, wherein each heating body further comprises:
- at least one thermally conductive adhesive, configured to adhere the first circuit and the second circuit to the surface of the metal-based heat dissipation plate and the third circuit to the other surface of the metal-based heat dissipation plate.

7. The temperature control assembly according to claim 3, further comprising:

a plurality of first connectors, wherein each of the first connectors has a plurality of contacts; and a plurality of wire sets, respectively corresponding to the plurality of heating units and the plurality of first connectors, wherein each of the wire sets has a plurality of wires, one ends of the plurality of wires of the each wire set are respectively electrically connected to the first circuit and the second circuit of the corresponding heating unit, and other ends of the plurality of wires of the each wire set are respectively coupled to the plurality of contacts of the corresponding first connector.

8. The temperature control assembly according to claim 7, further comprising:

a control panel, comprising:

a circuit substrate;

a control circuit, arranged on the circuit substrate and configured to receive, through the second circuit of the each heating unit, a temperature sensed by each of the temperature sensors, and supply power to the first circuit of the corresponding heating unit according to the temperature sensed by the each temperature sensor; and a plurality of second connectors, arranged on the circuit substrate, electrically connected to the control circuit, respectively matching the plurality of first connectors, and each being pluggably engaged with the corresponding first connector.

9. The temperature control assembly according to claim 1, wherein each heating body further comprises:

a thermally insulative fastener;

a heating block; and a thin-film electric heating piece, sandwiched between the thermally insulative fastener and the heating block, wherein the temperature sensor is arranged on the thin-film electric heating piece of the corresponding heating unit, and the bearing hole extends through the thermally insulative fastener, the thin-film electric heating piece, and the heating block of the corresponding heating unit.

10. A testing instrument, comprising:

a turntable;

a temperature control assembly, fixed to the turntable and comprising:

a control panel; and a plurality of heating units, arranged in a ring shape and each comprising:

a bearing hole; and a heating body, surrounding the bearing hole and electrically connected to the control panel; and a plurality of temperature sensors, respectively arranged on the plurality of heating units and electrically connected to the control panel;

an optical sensor, arranged on an other side of the temperature control assembly opposite to the turntable;

a rotary motor; and a rotary shaft, arranged between the turntable and the rotary motor to drive the turntable and the temperature control assembly to rotate, so that the bearing holes of the plurality of heating units are successively moved to the optical sensor.

11. The testing instrument according to claim 10, wherein the heating body of the each heating unit comprises:

a metal-based heat dissipation plate;

a first circuit, arranged on a surface of the metal-based heat dissipation plate and surrounding the bearing hole; and a second circuit, arranged on the surface of the metal-based heat dissipation plate, electrically isolated from the first circuit, and electrically connected to the corresponding temperature sensor.

12. The testing instrument according to claim 11, wherein the heating body further comprises:

at least one thermally conductive adhesive, configured to adhere the first circuit and the second circuit to the surface of the metal-based heat dissipation plate.

13. The testing instrument according to claim 11, wherein the heating body further comprises:

a third circuit, arranged on an other surface of the metal-based heat dissipation plate and electrically connected to the first circuit through at least one conductor.

14. The testing instrument according to claim 13, wherein the heating body further comprises:

at least one thermally conductive adhesive, configured to adhere the first circuit and the second circuit to the surface of the metal-based heat dissipation plate and the third circuit to the other surface of the metal-based heat dissipation plate.

15. The testing instrument according to claim 11, wherein the temperature control assembly further comprises:

a plurality of first connectors, wherein each of the first connectors has a plurality of contacts; and a plurality of wire sets, respectively corresponding to the plurality of heating units and the plurality of first connectors, wherein each of the wire sets has a plurality of wires, one ends of the plurality of wires of the each wire set are respectively electrically connected to the first circuit and the second circuit of the corresponding heating unit, and other ends of the plurality of wires of the each wire set are respectively coupled to the plurality of contacts of the corresponding first connector.

16. The testing instrument according to claim 15, wherein the control panel comprises:

a circuit substrate;

a control circuit, arranged on the circuit substrate and configured to receive an operation result of each of the temperature sensors and supply power to the first circuit of the corresponding heating unit according to the operation result of the each temperature sensor; and a plurality of second connectors, arranged on the circuit substrate, electrically connected to the control circuit, respectively matching the plurality of first connectors, and each being pluggably engaged with the corresponding first connector.

17. The testing instrument according to claim 10, wherein the heating body comprises:

a thermally insulative fastener;

a heating block; and a thin-film electric heating piece, sandwiched between the thermally insulative fastener and the heating block, wherein the temperature sensor is arranged on the thin-film electric heating piece of the corresponding heating unit, and the bearing hole extends through the thermally insulative fastener, the thin-film electric heating piece, and the heating block of the corresponding heating unit.

18. The testing instrument according to claim 10, wherein the temperature control assembly further comprises:

an electrically and thermally insulative base, fixed to the turntable, wherein the plurality of heating units surround and are fixed to the electrically and thermally insulative base, and two ends of the rotary shaft are respectively connected to the electrically and thermally insulative base and the rotary motor.

19. The testing instrument according to claim 10, further comprising: a fan assembly, arranged on an other side of the temperature control assembly opposite to the turntable.

* * * * *